United States Patent [19]

Wynn et al.

[11] 4,376,653

[45] Mar. 15, 1983

[54] PROCESS FOR THE PRODUCTION OF NICKEL, HIGH-PURITY MAGNESIUM OXIDE AND CEMENT

[75] Inventors: Nicholas P. Wynn; Michal Zabelka, both of Winterthur, Switzerland

[73] Assignee: Sulzer Brothers Limited, Winterthur, Switzerland

[21] Appl. No.: 347,197

[22] Filed: Feb. 9, 1982

[30] Foreign Application Priority Data

Sep. 29, 1981 [CH] Switzerland .................... 6246/81

[51] Int. Cl.$^3$ ................................................ C04B 7/02
[52] U.S. Cl. ...................................... 106/103; 423/150
[58] Field of Search ......................... 106/103; 423/150

[56] References Cited

U.S. PATENT DOCUMENTS

| | | | |
|---|---|---|---|
| 2,845,333 | 7/1958 | Schaufelberger | 423/150 |
| 3,466,144 | 9/1969 | Kay | 423/150 |
| 4,006,215 | 2/1977 | Hall et al. | 423/150 |
| 4,098,870 | 7/1978 | Fekete et al. | 423/150 |
| 4,125,588 | 11/1978 | Hansen et al. | 423/150 |
| 4,195,065 | 3/1980 | Duyvesteyn | 423/150 |

Primary Examiner—James Poer
Attorney, Agent, or Firm—Kenyon & Kenyon

[57] ABSTRACT

Sulphuric acid leaching is applied to recover nickel from a nickel-containing oxidic raw material which also contains magnesium and iron. High-purity magnesium oxide and cement are produced at the same time.

The heavy metals are separated by an organic metal extraction agent; nickel, cobalt and manganese are stripped therefrom by a mineral acid, and the nickel is recovered. Copper, zinc and iron are obtained by further stripping with sulphuric acid.

Carbon dioxide and ammonia are added to the aqueous solution obtained from the heavy metal separation stage to precipitate magnesium carbonate or hydroxide carbonate and an ammonium sulphate solution is formed. The precipitation product is separated and calcined to form magnesium oxide. Gypsum is formed from the ammonium sulphate solution and is fired to form cement clinker.

The resulting sulphur dioxide containing gas is processed in a sulphuric acid plant and used in the raw material leaching stage.

14 Claims, 1 Drawing Figure

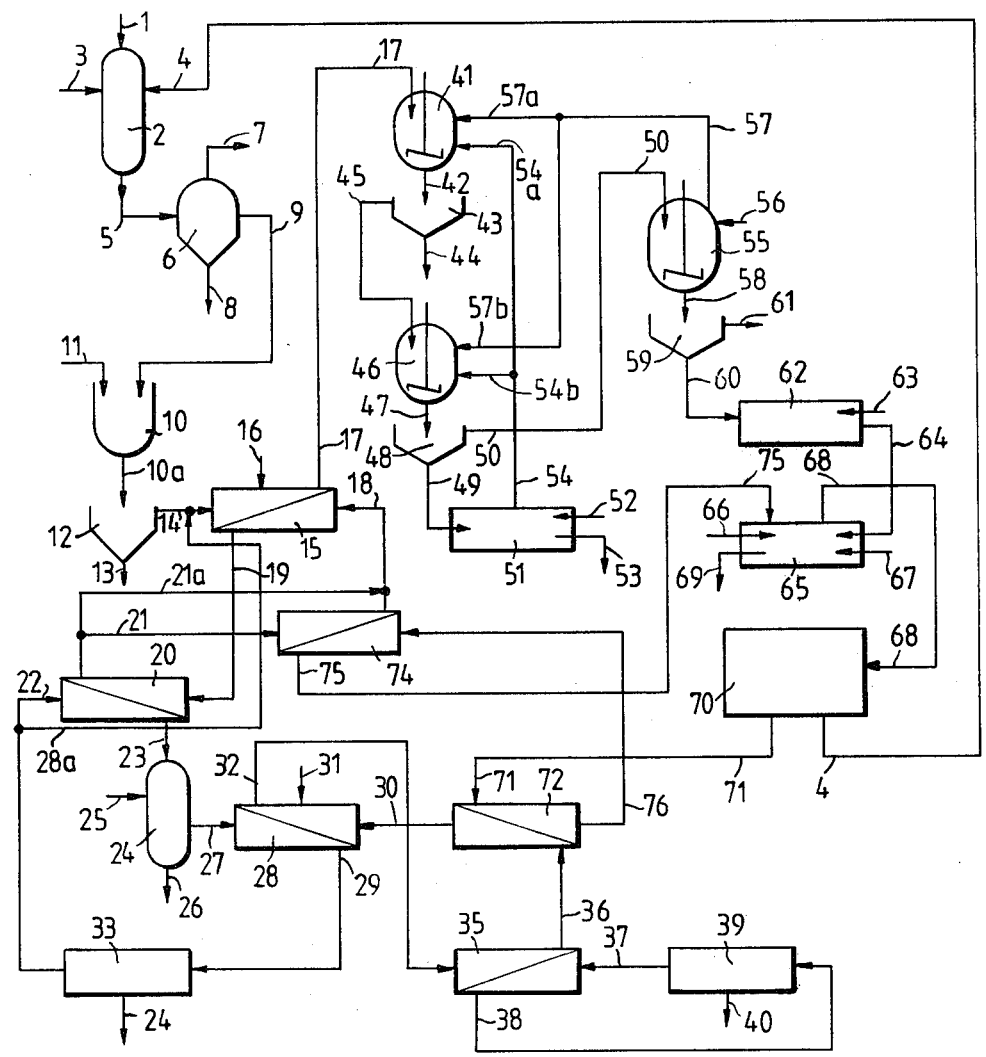

PROCESS FOR THE PRODUCTION OF NICKEL, HIGH-PURITY MAGNESIUM OXIDE AND CEMENT

This invention relates to a process for the production of nickel, high-purity magnesium oxide and cement. More particularly, this invention relates to a process of treating a nickel-containing oxidic raw material to obtain nickel, high-purity magnesium oxide and cement.

Heretofore, various types of processes have been known for obtaining nickel from a nickel-containing oxidic raw material. Generally, such processes utilize a sulphuric acid leaching to obtain the nickel from the raw material. However, it is also known that the raw materials frequently include, more particularly, laterite ores in which magnesium, iron, aluminum and manganese accompany the nickel. During a sulphuric acid leaching process, these substances fix a relatively considerable proportion of the sulphuric acid and, thus, have an adverse effect on the cost-effectiveness of the process. Further, such a process produces sulphates which cause disposal problems.

In order to overcome the above noted problems, it has been known to subject at least the resulting magnesium sulphate to a thermal decomposition to magnesium oxide. In this case, sulphur oxide gases form and are re-converted to sulphuric acid. This sulphuric acid is then recycled to the leaching stage of the process. However, this process is acceptable only if the magnesium oxide produced is of a quality so as to be used industrially, for example for the manufacture of refractory bricks. Of note, before such a product can be used industrially, the pure magnesium sulphate which has been evaporated, crystalized out and dried with a considerable energy consumption must be reduced in special kilns at high and accurately controlled temperature. This results in a process which is expensive both in terms of investment and operating costs. Moreover, the fuels used must have a low ash content in order to avoid impairing the quality of the magnesium oxide produced. Further, all the other substances which have dissolved in the form of sulphates in this process also form residues which fix considerable quantities of sulphuric acid.

Accordingly, it is an object of the invention to provide a process which is cost-effective in obtaining nickel from an oxidic raw material.

It is another object of the invention to provide a process of extracting nickel and magnesium oxide from an oxidic raw material which has a reduced impact on environmental pollution.

Briefly, the invention provides a process for the production of nickel, magnesium oxide and cement. In accordance with the invention, an oxidic raw material containing nickel, magnesium and iron is leached with sulphuric acid in a leaching stage at a temperature of up to 270° C. in order to obtain a mother liquor. Thereafter, a neutralization agent is added to the mother liquor to raise the pH of the liquor to a value between 5 and 7. Next, the mother liquor is contacted with an organic metal extraction agent in an extraction stage while a second neutralization agent is added to maintain a constant pH between 5 and 7 in order to separate heavy metals while retaining metal ions of the alkali-metals, alkaline-earth metals and magnesium in a depleted aqueous solution.

The charged organic metal extraction agent is then contacted with a mineral acid in order to strip nickel, cobalt and manganese into a metal solution. Nickel is then recovered from the metal solution and the depleted extraction agent is contacted with concentrated sulphuric acid to at least partially strip metals of the group consisting of copper, zinc and iron while obtaining a sulphuric acid solution. At least a part of this sulphuric acid solution can then be used for the production of cement.

The depleted aqueous solution obtained from the mother liquor is reacted with carbon dioxide and ammonia in a reactor at a pH of between 7 and 8.5, a temperature below 100° C. and a magnesium sulphate concentration of less than 25% in order to precipitate magnesium carbonate or hydroxy carbonate while forming an ammonium sulphate solution. The precipitated magnesium carbonate is then separated from the ammonium sulphate solution and calcined to form magnesium oxide and carbon dioxide. The carbon dioxide can then be recycled to the reactor.

The separated ammonium sulphate solution has quicklime added thereto in order to form a gypsum slurry and to liberate ammonia. This liberated ammonia may also be recycled to the reactor. The gypsum slurry is then dried and fired in a cement making stage in order to form a cement clinker while a sulphur dioxide containing gas is liberated. This latter gas may then be processed to form sulphuric acid which can be recycled, at least in part, to the leaching stage.

Since sulphuric acid is recovered, in cement manufacture, both from magnesium sulphate and from a number of other sulphate-containing residues, the net sulphuric acid consumption of the plant is low. If sulphur-containing fuels are used, they also contribute to balancing of sulphur budget. A considerable proportion of the residues obtained from purification of the leaching solution can be used for cement manufacture. This also improves the sulphur balance and reduces disposal problems. The addition of leaching residues in cement manufacture has the same effect. Finally, the cement kiln can be fired with coal dust whereas only low-ash fuels can be used in the direct decomposition of magnesium sulphate.

Another feature of the process is the elimination of foreign matter from the solvent extraction circuits used for the stripping steps. This purification operation is carried out by means of sulphuric acid which is produced in excess and which is then recycled, together with the foreign matter, to the cement making stage.

These and other objects and advantages of the invention will become more apparent from the following detailed description taken in conjunction with the accompanying drawing wherein:

The drawing illustrates a block diagram of a process according to the invention.

Referring to the drawing, in accordance with the process, an oxidic raw material, for example a laterite ore, is prepared by grinding and forming into a slurry with water and then fed via a flow path 1 to a leaching stage in the form of a pressure reactor 2. Steam is added via a line 3 and sulphuric acid is added via a line 4 to the pressure reactor 2 in order to heat the raw material at a temperature of up to 270° C. and to leach the material in order to obtain a mother liquor. The resulting suspension leaves the pressure reactor 2 over a flow path 5 and enters an expansion tank 6 in which the suspension is expanded and, thus, cooled.

The resulting low-pressure steam leaves the expansion tank 6 via a line 7 and can be used, for example, to preheat the raw material. The solids component of the suspension is removed from the mother liquor via a line 8. The mother liquor leaves the expansion tank 6 over a flow path 9 and enters a neutralization tank 10, in which the pH of the liquor is raised to a value of between 5 and 7 by a neutralizing agent introduced over a flow path 11. The mother liquor is fed via line 10a to decanter 12 where the solids are separated from the mother liquor and leave the decanter via an outlet 13. If advantageous, the solids can be fed to a cement kiln 65 incorporated into the process.

The mother liquor flows from the tank 12 over a path 14 to an extraction stage in the form of a multi-stage solvent extraction plant 15, in which the liquor is brought into contact with an organic metal extraction agent introduced via a line 18. During this extraction, all the metals excluding the ions of the alkali-metals, alkaline-earth metals and magnesium pass into the organic phase. A second neutralization agent is also introduced via a line 16 to keep the pH at a constant value between 5 and 7.

The now charged organic metal extraction agent flows over a flow path 19 to a multi-stage stripping plant 20, in which nickel, cobalt and manganese are stripped with a mineral acid such as a dilute sulphuric acid solution introduced via a line 22. The recovery of the nickel and cobalt is described hereinafter. Some of the now depleted metal extraction agent is fed over a flow path 21 to a second stripping plant 74 where the agent is brought into contact with concentrated sulphuric acid introduced over a flow path 76, some of the accompanying substances, particularly copper, zinc and iron, being stripped from the extraction agent. The metal extraction agent thus treated then flows over the flow path 18 to the solvent extraction plant 15 together with the remaining major part of the metal extraction agent depleted in the stripping plant 20, which reaches the flow path 18 over a flow path 21a.

The sulphuric acid solution leaving the stripping plant 20 and containing the extracted nickel, cobalt and manganese in the form of sulphates is fed over a flow path 23 to a pressure reactor 24 and is treated with compressed air introduced at elevated temperature via an inlet 25. In this oxyhydrolysis reaction, manganese is first precipitated, separated and discharged from the pressure reactor 24 via an outlet 26. The remaining sulphuric acid solution leaves the reactor 24 over a flow path 27 and is fed to a second solvent extraction plant 28 and is brought into contact with a second organic metal extraction agent introduced over a flow path 30. The pH is kept constant by a third neutralization agent introduced via an inlet 31. In the exchange of material in the second solvent extraction plant 28, the second metal extraction agent is charged with cobalt, the recovery of which will be described hereinafter.

The sulphuric acid solution from the second solvent extraction plant 28 flows over a flow path 29 to an electrolysis plant 33 in which the nickel is electrolytically deposited. The remaining low-nickel sulphuric acid solution flows over a flow path 22 to the first stripping plant 20.

The cobalt-charged second metal extraction agent leaves the second solvent extraction plant 28 over a flow path 32 and flows to a third stripper 35 to yield the cobalt to a sulphuric acid solution entering over a flow path 37. The resulting acidic cobalt sulphate solution flows over a flow path 38 to an electrolysis plant 39 in which the cobalt is electrolytically separated and leaves via an outlet 40. The metal extraction agent from which the cobalt has been removed flows via a path 36 to a fourth stripper 72 and is purified by concentrated sulphuric acid entering over a flow path 71. The purified metal extraction agent is fed to the second solvent extraction plant 28 over a flow path 30.

An aqueous solution containing mainly magnesium sulphate flows from the first solvent extraction plant 15 and is fed to a first agitated vessel reactor 41 to which carbon dioxide and ammonia are also fed over respective flow paths 54a, 57a. Residual metal contents are precipitated in the reactor 41 and the resulting suspension flows over a flow path 42 to a settling tank 43 and is decanted. The decanted aqueous solution from which solids have been removed flows over a flow path 45 to a second agitated vessel reactor 46 and is again reacted with carbon dioxide fed over a flow path 54b, and ammonia fed over a flow path 57b. The addition of carbon dioxide and ammonia is quantitatively controlled so that the pH of the aqueous solution is between 7 and 8.5, the temperature is kept below 100° C. and the magnesium sulphate concentration is less than 25%. These are the values at which the magnesium carbonate trihydrate is precipitated. This resulting magnesite slurry flows over a flow path 47 to a settling tank 48 and is separated from the aqueous solution therein. The remaining solid magnesium carbonate trihydrate leaves the settling tank 48 via a flow path 49 and enters a calcining kiln 51 in which the trihydrate is calcined, by means of a low-sulphur and low-ash fuel introduced via a line 52, to form magnesia containing more than 98% of magnesium oxide. The magnesia obtained is removed from the kiln via an outlet 53. The carbon dioxide which has formed, leaves the kiln 51 and is fed via a flow path 54 with branches 54b and 54a to the reactors 46, 41.

An ammonium sulphate solution also forms during the separation of the magnesium carbonate trihydrate in the settling tank 48. This solution is fed over a flow path 50 to an agitated vessel reactor 55 and together with quicklime introduced via a line 56, forms calcium sulphate or gypsum. The ammonia gas evolved flows over a flow path 57 with branches 57a and 57b to the reactors 41, 46. The gypsum slurry flows over a path 58 to a settling tank 59 and is separated therein from the water. The water leaves the settling tank 59 via a line 61. The gypsum leaves the settling tank 59 over a flow path 60 and flows to a drying kiln 62 in which the gypsum is dried with hot gas entering via an inlet 63. The now practically anhydrous gypsum flows over a path 64 to the cement kiln 65 and is fired, together with additives such as clay, shale, lime or sand introduced via a line 67, to form cement clinker. The cement kiln fuel, which may be ash-containing and sulphur-containing coal, refinery residues, etc., is introduced via a line 66. The sulphuric acid charged with stripped foreign matter in the second and fourth strippers 74 and 72 is also introduced into the cement kiln 65 via a flow path 75.

Sulphur dioxide containing gas leaves the kiln 65 and is fed via a flow path 68 to a sulphuric acid plant 70 where the gas is processed to form sulphuric acid. Some of the sulphuric acid is then fed to the fourth stripper 72 via a flow path 71 while the remainder is fed over a flow path 4 to the pressure reactor 2 of the leaching stage of the process.

The first neutralization agent fed to the neutralization tank via the flow path 11, the second neutralization agent fed to the first solvent extraction plant 15 via the line 16, and the third neutralization agent fed to the second solvent extraction plant 28 via the inlet 31, may preferably be some of the magnesium oxide leaving the calcining kiln 51 at the outlet 53.

To prevent the magnesium sulphate solution which forms in the third neutralization in the second solvent extraction plant 28 from concentrating in the circuit, the solution must be discharged. Since this solution still contains nickel, the solution is added over a flow path 28a to the mother liquor entering the first solvent extraction plant 15 via the path 14. The nickel is thus again extracted, the magnesium sulphate remaining in the aqueous phase, and finally reaches the agitator vessel reactor 46.

Instead of using magnesium oxide as the first, second and third neutralization agent, quicklime which originates from an extraneous source may be used. The gypsum precipitated during the neutralization is separated at a suitable place and fed to the cement kiln 65. A suitable place for the first neutralization agent is the settling tank 12, where the precipitated solids are discharged via the outlet 13, as already described.

Serpentine may also be used as the first neutralization agent.

Ammonia may be used as the second neutralization agent, preferably some of the ammonia forming in the reactor 55 during the formation of calcium sulphate or gypsum.

The organic metal extraction agent used in the first solvent extraction plant 15 may be a carboxylic acid, organic phosphoric acid, phosphonic acid, phosphinic acid or sulphonic acid dissolved in a hydrocarbon liquid. The organic metal extraction agent used in the second solvent extraction plant 28 may be an organic phosphoric acid, phosphonic acid or phosphinic acid dissolved in a hydrocarbon liquid.

A different mineral acid can be used instead of the dilute sulphuric acid in the first stripper 20 for stripping the nickel, cobalt and manganese from the organic metal extraction agent.

The invention thus provides a cost-effective process for obtaining not only nickel but also high-purity magnesium oxide and cement. Further, the sulphates which are produced can be used to make sulphuric acid, which, in turn, can be utilized in the process.

What is claimed is:

1. A process for the production of nickel, magnesium oxide and cement comprising the steps of
   leaching an oxidic raw material containing nickel, magnesium and iron with sulphuric acid in a leaching stage at a temperature of up to 270° C. to obtain a mother liquor;
   adding a first neutralization agent to the mother liquor to raise the pH of the mother liquor to a value between 5 and 7;
   contacting the mother liquor with an organic metal extraction agent in a first extraction stage and adding a second neutralization agent to maintain a constant pH between 5 and 7 to separate heavy metals while retaining metal ions of the alkali-metals, alkaline-earth metals and magnesium in a depleted aqueous solution;
   contacting the charged organic metal extraction agent with a mineral acid to strip nickel, cobalt and manganese therefrom in a metal solution;
   recovering nickel from the metal solution;
   contacting the depleted metal extraction agent with concentrated sulphuric acid to at least partially strip metals of the group consisting of copper, zinc and iron and obtain a sulphuric acid solution;
   removing at least a portion of the sulphuric acid solution for the production of cement;
   reacting the depleted aqueous solution with carbon dioxide and ammonia in a reactor at a pH of between 7 and 8.5, a temperature below 100° C. and a magnesium sulphate concentration of less than 25% to precipitate magnesium carbonate or hydroxy carbonate and to form an ammonium sulphate solution;
   separating the precipitated magnesium carbonate from the ammonium sulphate solution;
   calcining the separated magnesium carbonate in a calcining stage to form magnesium oxide and carbon dioxide;
   re-cycling the formed carbon dioxide to the reactor;
   adding quicklime to the separated ammonium sulphate solution to form a gypsum slurry and to liberate ammonia;
   re-cycling the liberated ammonia to the reactor;
   drying and firing the gypsum slurry in a cement making stage to form a cement clinker while liberating a sulphur dioxide containing gas;
   processing the sulphur dioxide containing gas to form sulphuric acid; and
   re-cycling at least some of the formed sulphuric acid to the leaching stage.

2. A process as set forth in claim 1 wherein each neutralization agent is magnesium oxide obtained from the calcining stage.

3. A process as set forth in claim 1 wherein each neutralization agent is quicklime and the gypsum precipitated in each neutralization operation is delivered to the cement making stage.

4. A process as set forth in claim 1 wherein the first neutralization agent is calcined serpentine.

5. A process as set forth in claim 1 wherein the second neutralization agent is ammonia.

6. A process as set forth in claim 1 wherein the organic metal extraction agent is one of a carboxylic acid, organic phosphoric acid, phosphonic acid, phosphinic acid and sulphonic acid dissolved in a hydrocarbon liquid.

7. A process as set forth in claim 1 wherein the mineral acid is dilute sulphuric acid and compressed air is added to the resulting sulphuric acid metal solution to precipitate manganese.

8. A process as set forth in claim 7 which further comprises the steps of contacting the remaining sulphuric acid metal solution with a second organic metal extraction agent in a second extraction stage to extract cobalt while adding a third neutralization agent to maintain the latter solution at a constant pH; recovering nickel from the cobalt depleted sulphuric acid metal solution; contacting the cobalt charged extraction agent with sulphuric acid to strip cobalt therefrom; and recovering the stripped cobalt.

9. A process as set forth in claim 8 wherein the second organic metal extraction agent is at least one of an organic phosphoric acid, phosphonic acid and phosphinic acid dissolved in a hydrocarbon liquid.

10. A process as set forth in claim 9 wherein the third neutralization agent is magnesium oxide obtained from the calcining stage and wherein magnesium sulphate forming in the second extraction stage is added to the mother liquor introduced into the first extraction stage.

11. A process as set forth in claim 8 wherein the third neutralization agent is quicklime and the gypsum precipitated in the third neutralization stage is delivered to the cement making steps.

12. A process as set forth in claim 8 wherein the third neutralization agent is magnesium oxide obtained from the calcining stage and wherein magnesium sulphate forming in the second extraction stage is added to the mother liquor introduced into the first extraction stage.

13. A process as set forth in claim 1 wherein solid residues obtained in at least one of the leaching stage and first neutralization stage is at least partially fed to the cement making stage.

14. A process for the production of nickel, magnesium oxide and cement comprising the steps of leaching an oxidic raw material containing nickel and magnesium with sulphuric acid in a leaching stage at a temperature of up to 270° C. to obtain a mother liquor;

adding a first neutralization agent to the mother liquor to raise the pH of the mother liquor to a value between 5 and 7;

contacting the mother liquor with an organic metal extraction agent in a first extraction stage and adding a second neutralization agent to maintain a constant pH between 5 and 7 to separate heavy metals while retaining metal ions of the alkali-metals, alkaline-earth metals and magnesium in a depleted aqueous solution;

contacting the charged organic metal extraction agent with a mineral acid to strip nickel therefrom in a metal solution;

reacting the depleted aqueous solution with carbon dioxide and ammonia in a reactor at a pH of between 7 and 8.5, a temperature below 100° C. and a magnesium sulphate concentration of less than 25% to precipitate magnesium carbonate and hydroxy carbonate and to form an ammonium sulphate solution;

separating the precipitated magnesium carbonate from the ammonium sulphate solution;

calcining the separated magnesium carbonate in a calcining stage to form magnesium oxide and carbon dioxide;

re-cycling the formed carbon dioxide to the reactor;

adding quicklime to the separated ammonium sulphate solution to form a gypsum slurry and to liberate ammonia;

re-cycling the liberated ammonia to the reactor;

drying and firing the gypsum slurry in a cement making stage to form a cement clinker while liberating a sulphur dioxide containing gas;

processing the sulphur dioxide containing gas to form sulphuric acid; and re-cycling at least some of the formed sulphuric acid to the leaching stage.

* * * * *